(12) United States Patent
Hodgson et al.

(10) Patent No.: US 9,765,665 B2
(45) Date of Patent: Sep. 19, 2017

(54) METHOD FOR OPERATING A DEVICE FOR PROVIDING A LIQUID ADDITIVE

(71) Applicant: CONTINENTAL AUTOMOTIVE GMBH, Hannover (DE)

(72) Inventors: Jan Hodgson, Troisdorf (DE); Yves Kopp, Remering-les-Puttelange (FR); Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/898,073

(22) PCT Filed: Jun. 4, 2014

(86) PCT No.: PCT/EP2014/061544
§ 371 (c)(1),
(2) Date: Dec. 11, 2015

(87) PCT Pub. No.: WO2014/198596
PCT Pub. Date: Dec. 18, 2014

(65) Prior Publication Data
US 2016/0115837 A1    Apr. 28, 2016

(30) Foreign Application Priority Data
Jun. 13, 2013    (EP) .................... 13290138

(51) Int. Cl.
*F01N 3/20*    (2006.01)
(52) U.S. Cl.
CPC ........... *F01N 3/206* (2013.01); *F01N 3/2066* (2013.01); *F01N 2610/02* (2013.01);
(Continued)

(58) Field of Classification Search
CPC .... F01N 3/206; F01N 3/2066; F01N 2610/02; F01N 2610/1406; F01N 2610/1426; F01N 2610/1486; F01N 2610/1493; Y02T 10/24
See application file for complete search history.

(56) References Cited

U.S. PATENT DOCUMENTS 5,884,475 A * 3/1999 Hofmann ........... B01D 53/9431
60/274
8,850,797 B2   10/2014 Dougnier et al.
(Continued)

FOREIGN PATENT DOCUMENTS

BE   WO 2006064028 A1 *  6/2006  ......... B01D 53/9431
DE   10 2009 054735 A1     6/2011
(Continued)

OTHER PUBLICATIONS

Office Action dated Apr. 13, 2017 which issued in the corresponding Korean Patent Application No. 10-2016-7000823.

*Primary Examiner* — Patrick Maines
(74) *Attorney, Agent, or Firm* — Cozen O'Connor (57) ABSTRACT

A method for operating a device for providing a liquid additive, the device having a delivery path running from a tank to an additive dispensing device, at least one section of the delivery path forming a jacket, includes: delivering the liquid additive from the tank to the additive dispensing device along the delivery path in a delivery direction; stopping the delivery of the liquid additive; at least partially evacuating the section of the delivery path; and forming a thermal insulator in the jacket by the evacuated delivery path.

9 Claims, 3 Drawing Sheets (52) U.S. Cl.
CPC .. *F01N 2610/10* (2013.01); *F01N 2610/1406* (2013.01); *F01N 2610/1426* (2013.01); *F01N 2610/1486* (2013.01); *F01N 2610/1493* (2013.01); *Y02T 10/24* (2013.01)

(56) References Cited

U.S. PATENT DOCUMENTS

| | | | | |
|---|---|---|---|---|
| 2007/0283685 | A1* | 12/2007 | Ripper | B01D 53/90 60/288 |
| 2010/0071351 | A1* | 3/2010 | Nishimura | F01N 3/206 60/286 |
| 2010/0095653 | A1* | 4/2010 | Thiagarajan | F01N 3/208 60/286 |
| 2010/0212290 | A1* | 8/2010 | Thiagarajan | F01N 3/2066 60/274 |
| 2010/0229532 | A1* | 9/2010 | Ohno | F01N 3/208 60/274 |
| 2011/0000196 | A1* | 1/2011 | Kasahara | F01N 3/2066 60/286 |
| 2012/0311999 | A1 | 12/2012 | Hodgson et al. | |
| 2014/0174058 | A1 | 6/2014 | Maguin et al. | |
| 2015/0300230 | A1 | 10/2015 | Brueck et al. | |
| 2016/0040577 | A1* | 2/2016 | Nihongi | F01N 3/2066 73/49.5 |

FOREIGN PATENT DOCUMENTS

| | | | | |
|---|---|---|---|---|
| DE | 102010014314 A1 | * | 10/2011 | .......... F01N 3/2066 |
| DE | 10 2011 002573 A1 | | 7/2012 | |
| JP | 2013076405 A | | 4/2013 | |
| KR | 2012-0112758 | | 10/2012 | |
| WO | WO 2013/030066 | | 3/2013 | |
| WO | WO 2014/086553 A1 | | 6/2014 | |

\* cited by examiner

METHOD FOR OPERATING A DEVICE FOR PROVIDING A LIQUID ADDITIVE

CROSS-REFERENCE TO RELATED APPLICATIONS

This is a U.S. national stage of application No. PCT/EP2014/061544, filed on 4 Jun. 2014, which claims priority to the European Application No. EP 13290138.0 filed 13 Jun. 2013, the content of both incorporated herein by reference.

BACKGROUND OF THE INVENTION

1. Field of the Invention

The invention relates to a method for operating a device for providing a liquid additive and to a corresponding device for carrying out the method according to the invention.

2. Related Art

Devices for providing a liquid additive are used in particular in the automotive field for supplying a liquid additive to the exhaust-gas treatment device of a motor vehicle. Of particularly great significance are exhaust-gas treatment devices in which nitrogen oxide compounds in the exhaust gas of an internal combustion engine are reduced with the aid of a reducing agent to form non-hazardous substances such as nitrogen, $CO_2$ and water. The corresponding exhaust-gas method is referred to as the SCR [Selective Catalytic Reduction] method.

Ammonia is normally used as reducing agent for this method. Ammonia is normally stored in motor vehicles not directly but rather in the form of a reducing agent precursor solution which can be stored as liquid additive and also provided to the exhaust-gas treatment device as liquid additive. The liquid additive is then converted, thermally or hydrolytically, within the exhaust gas to form the actual reducing agent ammonia. "Hydrolytically" means that the conversion reaction is assisted by a hydrolysis catalyst which may, for example, be provided on a substrate honeycomb body in the exhaust-gas treatment device. For the SCR method, a urea-water solution with a urea content of 32.5% is available under the trade name AdBlue®.

A problem of such liquid additives is that they can freeze at low temperatures. The described 32.5% urea-water solution, for example, freezes at −11° C. In the automotive field, such low temperatures can arise in particular during long standstill periods in winter. To be able to operate a device for providing liquid additive even at low temperatures despite the risk of freezing, and to make it possible in particular for such a device to be set in operation quickly after a long standstill phase, it is known for the device to be at least partially evacuated after a stoppage of operation. It can thus be ensured that no liquid additive is present at least in parts of the device, and thus freezing cannot occur there. It is further known for heaters to be provided in the devices for providing liquid additive, by which heaters at least parts of the device can be heated. By the heating, freezing of the liquid additive can be prevented, or frozen liquid additive can be thawed again.

Despite those measures, it is normally not possible for the device to be set in operation quickly if the liquid additive in a tank and within a delivery unit for delivering the liquid additive has completely frozen. Rather, it is necessary for the liquid additive in the tank to be at least partially melted. The liquid additive in the delivery unit must normally be completely thawed, or the delivery unit has been evacuated before the freezing process. The thawing of the frozen additive requires a certain period of time because, for the thawing of the corresponding volumes of liquid additive, a certain minimum amount of energy is required, which can be provided only at a limited rate.

SUMMARY OF THE INVENTION

It is an object of the present invention to solve, or at least reduce, the technical problems discussed above. It is sought in particular to describe a particularly advantageous method for operating a special device for providing liquid additive, which device freezes very seldomly and is particularly easy to thaw in the event of frozen additive being present in the device.

The objects are achieved by means of a method according to the features disclosed herein. The features specified individually may be combined with one another in any desired technologically meaningful way and may be supplemented by explanatory facts from the description and in particular from the description in conjunction with the figures, with further embodiments of the invention being specified.

In one aspect, invention relates to a method for operating a device for providing a liquid additive, having a delivery path which runs from a tank to an additive dispensing device, wherein at least one section of the delivery path forms a jacket, having at least the following steps:

a) delivering liquid additive from the tank to the additive dispensing device along the delivery path in a delivery direction;

b) stopping the delivery;

c) at least partially evacuating the section of the delivery path; and d) forming a thermal insulator in the jacket by the evacuated delivery path.

A device for providing a liquid additive normally comprises a delivery unit that delivers the liquid additive. For the delivery process, a delivery unit normally has a pump. The delivery unit may additionally comprise further active components. Such components are, for example, valves, by which the delivery of the liquid additive is controlled, or sensors, by which the delivery of the liquid additive is monitored. In addition to the delivery of the liquid additive, the delivery unit may also perform dosing of the liquid additive. For this purpose, the delivery unit may for example have a pump whose delivery rate is precisely adjustable. This is possible for example in the case of some reciprocating-piston or diaphragm-type pumps, in which the delivery rate is proportional to the number of delivery strokes performed by the pump. It is also possible for the pump not to perform a dosing function but rather merely to generate a predefined pressure increase and provide liquid additive at a defined pressure at an additive dispensing device.

The additive dispensing device may, for example, be a supply device by which the liquid additive can be supplied to an exhaust-gas treatment device. An additive dispensing device may comprise a nozzle by which the liquid additive can be distributed in finally atomized fashion in an exhaust-gas treatment device. Furthermore, the additive dispensing device may have a dosing valve by which dosing of the liquid additive can be performed. A dosing valve is expedient in particular if a delivery unit does not perform a dosing function.

The delivery path is the path from the tank, in which the liquid additive is stored, to the additive dispensing device. The delivery path is normally formed by lines, which may be formed, for example, by hoses. It is also possible for the delivery path to be formed at least in sections by bores in a block. Such a block may, for example, be an assembly base body on which the active components described further above are mounted.

A jacket formed by the delivery path is, for example, a section of the delivery path that extends along a surface. The surface preferably delimits a certain region of the device with respect to another region of the device, such that the regions of the additive dispensing device are thermally separated from one another by the thermal insulator in the jacket. That section of the delivery path that forms the jacket may, for example, have a wound, meandering form. The individual windings of the section of the delivery path then form the jacket. It is also possible for the delivery path to be formed, in the region of the jacket, as an areal cavity. Such an areal cavity has a two-dimensional extent.

During the delivery of the liquid additive as per step a), the device is normally in operation. The internal combustion engine of a motor vehicle having a described device is typically in operation during step a), and in the process produces exhaust gases that are conducted into an exhaust-gas treatment device. For the purification of the exhaust gases, the described device supplies liquid additive to the exhaust-gas treatment device of the motor vehicle.

A stoppage of the delivery of the device takes place in step b). Normally, step b) takes place as part of a stoppage of operation of a motor vehicle having the de-scribed device. In parallel with the stoppage of the delivery, it is normally the case that certain routines are performed, by which the device is placed into a state of operational standstill. Such a routine may, for example, be to store in an electronic memory the amount of liquid additive that has been provided by the device. The information can be used at a later point in time to update an item of information regarding a fill level of liquid additive in the tank. As part of the routines for the stoppage of the delivery, the at least partial evacuation of the section of the delivery path as per step c) is also performed. The evacuation has the effect, inter alia, that the additive is prevented from freezing in the delivery path in the presence of low temperatures.

In step d), the thermal insulator is created in the jacket. This takes place in parallel with the evacuation in step c), by virtue of the liquid additive in the section being replaced with a substitute substance. The formation of the insulator is typically realized by virtue of the substitute substance having considerably lower thermal conductivity than the liquid additive. The substitute substance may, for example, be air. The thermal conductivity of air is several times lower than the thermal conductivity of liquid additive. After step d), heat in the region of the section of the delivery path is transmitted between different wall sections of the delivery path substantially only by heat radiation. Heat transfer by heat conduction through the liquid additive, or through the replacement substance, substantially no longer occurs. Therefore, the thermal conductivity through the jacket is considerably reduced after step d).

Owing to the formation of the thermal insulator described, it is made possible to ensure targeted freezing of the device. An outflow of the heat from the device can be controlled in an effective manner by the thermal insulator. Furthermore, the device is altogether better thermally insulated, such that the freezing process can be slowed in terms of time. Altogether, the number of freezing events of the device can thus be reduced considerably. It is furthermore made possible for the device to be set in operation more quickly after a break in operation if frozen liquid additive is present in the device, because, by the thermal insulator, targeted heating of the device is also possible. Regions that do not need to be heated are thermally insulated from regions that do need to be heated. The heat energy does not flow, unused, into regions in which it is not required.

The method is particularly advantageous if the section of the delivery path is evacuated by virtue of the liquid additive being delivered from the delivery path back into the tank counter to the delivery direction.

The described evacuation of the delivery path may be realized, for example, by a pump in a delivery unit of the device, which pump has a reversible delivery direction. The pump or the delivery unit may have at least one valve for reversing the delivery direction. The delivery direction of the pump may be reversed for example by virtue of valves of the delivery unit or of the pump being switched such that the delivery unit delivers the liquid additive counter to the delivery direction. It is also possible for the delivery direction of the pump to be changed by virtue of a pump drive being operated in a different direction. This may be realized for example by a reversal of the polarity of the pump drive. A further possibility for the evacuation of the delivery path is for there to be provided in the device not only the pump for the delivery of the liquid additive but also a second pump for evacuation purposes, by which second pump the evacuation of the delivery path can be performed.

An evacuation of the delivery path by virtue of the liquid additive being delivered back into the tank is particularly advantageous because, by such an evacuation, no losses of liquid additive occur. The liquid additive that has been removed from the delivery path is made available again upon a subsequent start of operation of the device.

A further possibility for the evacuation of the delivery path is for an evacuation to be realized by circulation. In that case, there is then typically a branch from the delivery path, which branch extends from the delivery path back into the tank. The liquid additive in the delivery path may then be delivered back into the tank by being circulated from the delivery path through the branch. The branch may also be referred to as a return line.

The method is furthermore advantageous if the section of the delivery path is evacuated by virtue of the liquid additive in the section of the delivery path being at least partially evaporated.

For the evaporation of the liquid additive, the device may have a heater. An evaporation of the liquid additive in the section of the delivery path may be realized for example by virtue of the heater heating the liquid additive in the section of the delivery path until the liquid additive evaporates. Additive that has changed into the gaseous state typically exhibits much lower thermal conductivity than the liquid additive. A thermal insulator is thus also formed by the evaporation of the liquid additive.

Such an embodiment of the method is advantageous because evacuating the delivery path can in this case be done in a particularly simple manner. In particular, it is not necessary for a pump or a delivery unit of the device to have a reversible delivery direction. Only the described heater is required in the device.

In the case of the method implementation, the liquid additive may however be chemically converted because the conversion temperature of the liquid additive lies close to the evaporation temperature. The chemical conversion may be a problem because this can result in contaminants forming in the device. This however may be outweighed by the advantage of the simpler construction of the device.

It is also sought here to describe a device for carrying out the described method, wherein the device has a delivery unit and the jacket at least partially surrounds the delivery unit.

The special advantages and design features specified for the described method can be applied and transferred analogously to the described device. The same applies to the special advantages and design features of the device described below, which can be applied and transferred to the method.

In particular, the jacket is particularly advantageous if it is arranged between the delivery unit of the device and an interior of the tank for the liquid additive. The thermal insulator in the jacket thus insulates an interior of the tank, in which the liquid additive is stored, with respect to the delivery unit. The arrangement of the jacket and of the thermal insulator therefore makes it possible for the freezing behavior and the thawing of the liquid additive in the interior of the tank and of the delivery unit to be influenced separately from one another. This makes it possible for the delivery unit to be made operationally ready particularly rapidly after a stoppage of operation, because the liquid additive in the delivery unit can be heated in a targeted manner, and a particularly small amount of liquid additive in the tank can additionally be heated in a targeted manner. An unnecessary outflow of heat into regions of the tank that do not need to be thawed in order for the device to be started up can be prevented. If the liquid additive has been completely removed from the delivery unit during the evacuation in step c), it is also possible, by the insulator, for an outflow of heat into the delivery unit to be prevented, and for only a certain region of the liquid additive in the interior of the tank to be thawed in a targeted manner. Conduction of heat from the heater into the delivery unit is then generally not required because, owing to the evacuation, there is then no frozen liquid additive present in the delivery unit. This, too, promotes a particularly rapid start-up of the device after a break in operation if the liquid additive has at least partially frozen.

The device is furthermore advantageous if the device has a heater, wherein the jacket is arranged at least partially between the heater and the delivery unit, such that the thermal insulator in the jacket at least partially thermally insulates the delivery unit with respect to the heater.

Thus, in this embodiment, the heater is arranged on that side of the jacket at which the tank interior is also situated. The delivery unit is thermally insulated with respect to the heater. Such an arrangement is expedient in particular if the delivery unit is completely evacuated during the evacuation in step c), and the delivery path is completely free from liquid additive. It is then possible for the heat energy produced by the heater to be introduced, in a targeted manner, into a region of the tank interior in which liquid additive is present, such that a predetermined starting volume of liquid additive, with which the operation of the device can be commenced, is made available particularly rapidly.

The device is furthermore advantageous if the heater has at least one active heating section and at least one passive heat distribution section, wherein the passive heat distribution section is insulated with respect to the delivery unit by the thermal insulator in the jacket.

In one embodiment of the device, both the heat distribution section and also the heating section are thermally insulated with respect to the delivery unit by the thermal insulator. In a further design variant, only the heat distribution section is thermally insulated with respect to the delivery unit by the thermal insulator. In the region of the heating section, the delivery path does not form a jacket. Here, however, there may be formed some other (conventional) heat insulator, which may, for example, be composed of a thermal insulation mat, in order to also thermally insulate the heating section with respect to the delivery unit.

In the case of such an arrangement, at least a part of the heat energy produced by the heater is also introduced into the delivery unit, such that the delivery unit, even in the event of a long break in operation, is rapidly heated to above the freezing temperature together with the liquid additive. This is also advantageous if the delivery unit is completely evacuated during the evacuation in step c). In this case, it would be highly disadvantageous for the molten liquid additive in the tank interior to be delivered into the delivery unit when the latter is still below the freezing temperature, because the liquid additive could then suddenly freeze in the delivery unit. This can be prevented by virtue of at least the active heating section not being thermally insulated with respect to the delivery unit. Furthermore, electrical contacting of the active heating section is normally necessary in order for electrical energy to be provided to the heater. The electrical contacting is normally realized via the delivery unit. In the delivery unit, there is normally arranged a control unit that controls the provision of heating energy to the heater. Electrical contacting through a thermal insulator formed in a jacket would be cumbersome. Electrical contacts could however extend through a conventional thermal insulator. It is therefore advantageous for the active heating section not to be separated from the delivery unit by the jacket, in order that the electrical lines can run from the delivery unit to the active heating section.

The device is furthermore advantageous if a filter for filtering the liquid additive in the delivery path is arranged in the region of the jacket.

The delivery path must normally, for structural reasons, have an areal extent in the region of the jacket in order that the thermal insulator can be designed in an effective manner. The available space is particularly suitable for accommodating a filter for filtering the liquid additive. A filter should normally have a large surface area in order that the filter does not become blocked by contaminants. Providing the filter in the region of the jacket in the delivery path thus has the positive synergetic effect that the section of the delivery path for the jacket is additionally used in a particularly space-saving manner.

The device is furthermore advantageous if the delivery unit is arranged in a partitioned-off chamber in a tank for the liquid additive, and the jacket runs at least partially along a wall of the partitioned-off chamber and forms an areal cavity, such that the thermal insulator insulates the partitioned-off chamber with respect to a tank interior.

Providing a partitioned-off chamber for the delivery unit within a tank for the liquid additive is particularly advantageous because, in this way, the delivery unit can be arranged in a particularly space-saving manner. In particular, no additional structural space for the delivery unit is required in a motor vehicle. Furthermore, in the case of such a design, a mounting region for the delivery unit has to be provided only on the tank. No special configuration of the motor vehicle is required in order to permit the mounting of the delivery unit. Furthermore, there is no need for adaptation of the delivery unit to the structural space available in the motor vehicle. The tank forms an interface by which the delivery unit is jointly mounted in the motor vehicle.

In the case of a delivery unit being arranged in the tank, it is however normally more difficult for the delivery unit to be thermally insulated with respect to the liquid additive in the tank interior. The disadvantage is overcome by the device described here. A particularly effective thermal insulator can be provided between a tank interior and a delivery unit in a partitioned-off chamber in the tank.

The device is furthermore advantageous if the delivery path is, in the region of the jacket, formed by an areal cavity between a wall of the partitioned-off chamber and a bell-shaped cover which surrounds the partitioned-off chamber, wherein the delivery path opens from the tank interior into the areal cavity at a base region of the bell-shaped cover and exits the areal cavity through at least one internal suction point at a top region of the bell-shaped cover.

A gap exists between the wall of the partitioned-off chamber and the bell-shaped cover. The gap forms the areal cavity. The areal cavity is preferably in the form of a hollow cylinder. In the base region, the areal cavity is connected to the tank interior via an annular gap. The base region is preferably referred to as base region because the base region is arranged in the vicinity of the tank base. The top region is preferably referred to as top region because it is arranged at the top side, opposite the base region, on the bell-shaped cover. The bell-shaped cover is closed off at the top region preferably by a cap or a lid. The internal suction point is preferably formed by an opening or a bore through which the liquid additive can be sucked out of the areal cavity into the partitioned-off chamber or into the delivery unit. The liquid additive thus flows into the areal cavity at the base region through the annular gap and exits the areal cavity at the top region through the at least one suction point. The areal cavity between the wall of the partitioned-off chamber and the bell-shaped cover is thus part of the delivery path.

When the areal cavity has been evacuated in accordance with method steps c) and d), the delivery path downstream of the areal cavity as viewed in the flow direction is closed off in a preferably fluid-tight and gas-tight manner. It is accordingly possible for a follow-up flow of liquid additive from the tank into the areal cavity to be prevented. The areal cavity remains free from liquid additive owing to the gas pressure of the substitute medium (normally air) in the areal cavity, in the manner of a diving bell.

The filter for filtering the liquid additive is preferably arranged in the areal cavity. The filter is preferably arranged parallel to the wall and preferably also parallel to regions of the bell-shaped cover. It is accordingly possible for a filter with a particularly large surface area to be arranged in the areal cavity. The surface area of the filter preferably corresponds (approximately) to the total surface area of the areal cavity.

The device is furthermore advantageous if the wall of the partitioned-off chamber and the bell-shaped cover are manufactured from plastic, and at least one section of at least one heater for heating liquid additive in the tank interior is at least partially embedded into the bell-shaped cover.

The bell may, for example, be manufactured as an injection-molded part. The heater may, for example, be formed from electrical resistance conductors or PTC [Positive Temperature Coefficient] conductors which permit active heating by a flow of current. It is also possible for the heater to be formed from an active heating section and a passive heat distribution section, wherein only the passive heat distribution section is embedded into the bell-shaped cover. The plastics material of the bell-shaped cover protects the heater from the liquid additive, which typically has a highly corrosive action. The bell-shaped cover may, for example, be manufactured by an injection molding process, wherein the heater is laid into the injection mold and hereby encapsulated by the plastic. If only the passive heat distribution sections are embedded into the cover, the active heating section may be mounted onto the bell-shaped cover from an inner side and connected to the passive heat distribution sections.

The bell-shaped cover may be fixedly connected to the chamber or to the wall of the chamber. It is preferable for the bell-shaped cover and the chamber to be manufactured as one injection-molded component. The partitioned-off chamber and the bell-shaped cover may be inserted into a base of a tank for the liquid additive so as to extend into a tank interior of the tank proceeding from the base of the tank. For this purpose, the tank may have, in the base, an opening into which the partitioned-off chamber is inserted. The tank may also be manufactured from plastic. The partitioned-off chamber and the tank may be fixedly connected to one another by a weld seam.

Is also the intention here to describe a motor vehicle having an internal combustion engine and having an exhaust-gas treatment device for the purification of the exhaust gases of the internal combustion engine and also having a device by which a liquid additive can be supplied to the exhaust-gas treatment device.

The described method can be carried out by the device of the motor vehicle. In the exhaust-gas treatment device of the motor vehicle there is preferably provided an SCR catalytic converter in which, with the aid of the supplied liquid additive, the method of selective catalytic reduction can be performed for the purification of the exhaust gases of the internal combustion engine.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and in particular the illustrated proportions are merely schematic. In the figures.

DETAILED DESCRIPTION OF THE PRESENTLY PREFERRED EMBODIMENTS

Figure 1:
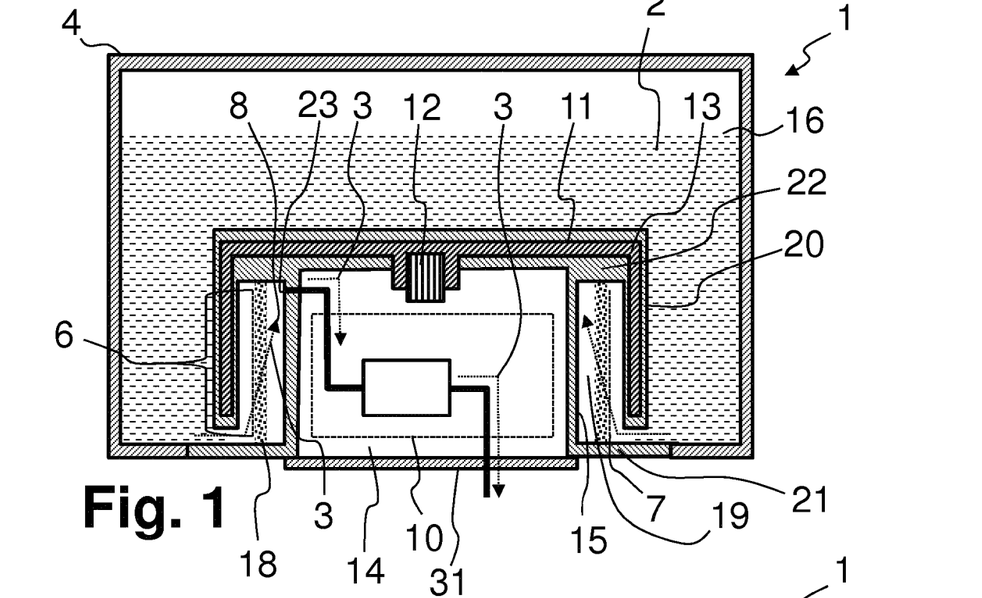
FIG. 1: shows a first design variant of a described device.
Figure 2:
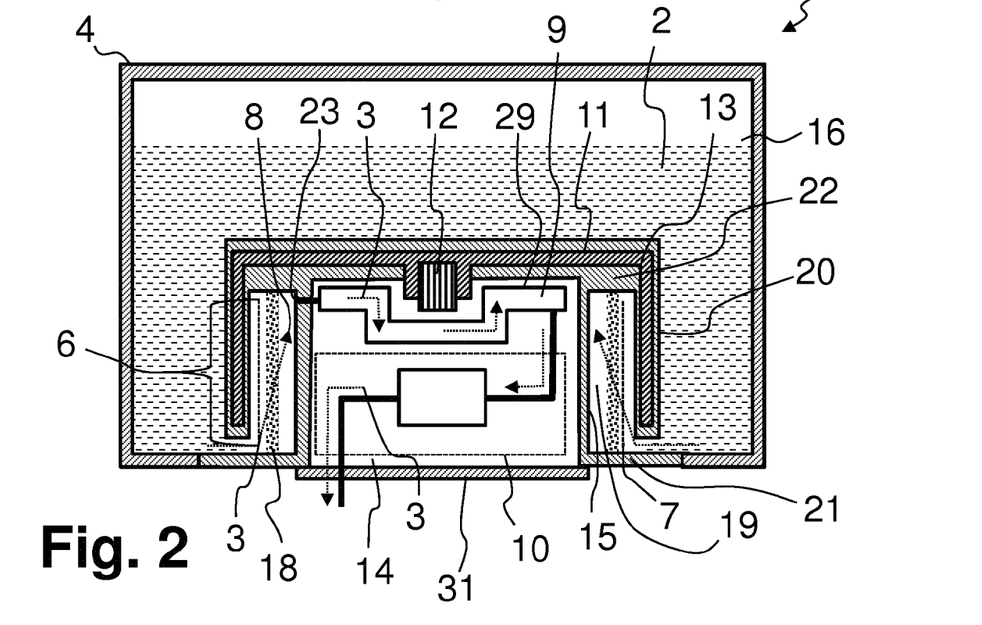
FIG. 2: shows a second design variant of a described device.

The two embodiments of a described device 1 as per FIGS. 1 and 2 will initially be explained jointly, with differences being discussed thereafter. The device 1 as per FIGS. 1 and 2 has, in each case, a tank 4 in which liquid additive 2 can be stored. In the tank 4 there is situated a partitioned-off chamber 14, which is partitioned off from the tank interior 16, in which the liquid additive 2 is stored, by a wall 15.

Situated in the partitioned-off chamber 14 is the delivery unit 10 by which the liquid additive 2 can be extracted from the tank 4. For this purpose, a delivery path 3 is provided which extends from the tank interior 16 through the delivery unit 10 to an additive dispensing device (not illustrated here). The delivery unit 10 can deliver the liquid additive 2 along the delivery path 3 from the tank 4 to the additive dispensing device (not illustrated).

The partitioned-off chamber 14 is arranged on a base of the tank 4, such that the extraction of the liquid additive 2 from the tank 4 by the delivery unit 10 takes place in the vicinity of the tank base, and the liquid additive 2 in the tank 4 can be extracted as completely as possible by the delivery unit 10. On the partitioned-off chamber 14 there is provided a bell-shaped cover 20 which covers the partitioned-off chamber 14. The bell-shaped cover 20 and the partitioned-off chamber 14 are, in FIGS. 1 and 2, formed as one component. It is however also possible for the partitioned-off chamber 14 and the bell-shaped cover 20 to be two separate components which are mounted on one another.

Between the bell-shaped cover 20 and the wall 15 of the partitioned-off chamber 14 there is an areal cavity 17 which (see FIG. 3) is formed by a gap 19 between the bell-shaped cover 20 and the wall 15. The areal cavity 17 forms a section 6 of the delivery path 3 from the tank 4 to the delivery unit 10. A filter 18 for filtering the liquid additive 2 is arranged in the areal cavity 17. The delivery path 3 opens into the areal cavity 17 in the base region 21 of the bell-shaped cover 20 and of the tank 4. The delivery path 3 exits the areal cavity 17 in the top region 22 of the bell-shaped cover 20 at the internal suction point 23. The bell-shaped cover 20, when evacuated, thus acts in the manner of a diving bell, and there is no follow-up flow of liquid additive 2 from the tank 4 into the bell-shaped cover 20.

In the situations illustrated in FIGS. 1 and 2, liquid additive 2 is situated only in the tank interior 16 of the tank 4 and not in the delivery path 3, and thus also not in the jacket 7, the areal cavity 17 or the section 6. Thus, a thermal insulator 9 is formed in the section 6 and in the jacket 7 and in the areal cavity 17, which thermal insulator thermally insulates the delivery unit 10 with respect to the tank interior 16.

The device 1 as per FIGS. 1 and 2 has a heater 11 in the bell-shaped cover 20. The heater 11 may for example be integrally cast into the bell-shaped cover 20. The heater 11 has an active heating section 12 and a passive heat distribution section 13, by which the heat generated in the active heating section 12 is distributed in a targeted manner. In FIG. 1, the thermal insulator 9 provides insulation of the delivery unit 10 with respect to the tank interior 16 only at a circumferential surface of the partitioned-off chamber 14.

In FIG. 2, an areal element 29 is additionally provided in the delivery path 3, which areal element makes it possible to also realize a thermal insulator 9 at the top region 22, in order to make it possible to realize a more complete thermal insulator 9 for insulating the partitioned-off chamber 14 and the delivery unit 10 with respect to the tank 4 and with respect to the liquid additive 2 in the tank interior 16. In FIGS. 1 and 2, the partitioned-off chamber 14 is in each case closed off from the direction of an outer side of the tank 4 by a lid 31, such that the delivery unit 10 is protected against contaminants or moisture from the outside.

Figure 3:
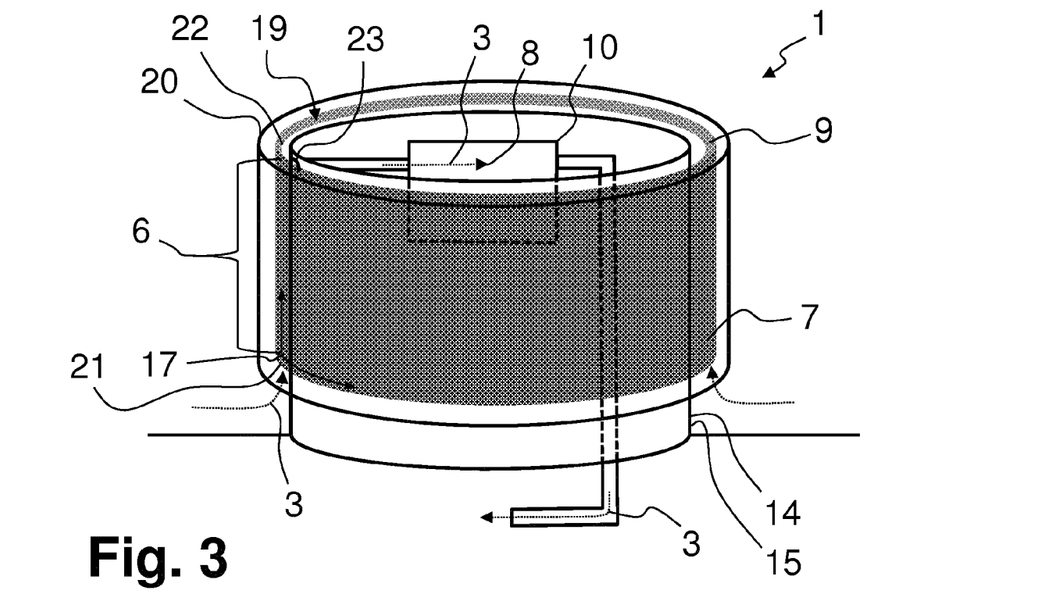
FIG. 3: shows a three-dimensional view of a described device.

FIG. 3 shows a three-dimensional view of a device 1. It is possible here to see the partitioned-off chamber 14 in which the delivery unit 10 is situated. The bell-shaped cover 20 is arranged around the outside of the partitioned-off chamber 14. Between the bell-shaped cover 20 and the wall 15 of the partitioned-off chamber 14, there is an areal cavity 17 that constitutes a section 6 of a delivery path 3 and which forms a jacket 7 around the partitioned-off chamber 14 and around the delivery unit 10. The delivery unit 10 can deliver the liquid additive from the tank on the delivery path 3 in a delivery direction 8. The delivery path 3 opens into the areal cavity 17 or into the jacket 7 of the delivery path 3 from the tank (not illustrated) in the base region 21, and exits the areal cavity 17, or the jacket 7, at the internal suction point 23 in a top region 22. When the jacket 7 and the areal cavity 17 are free from liquid additive, a thermal insulator 9 is formed.

Figure 4:
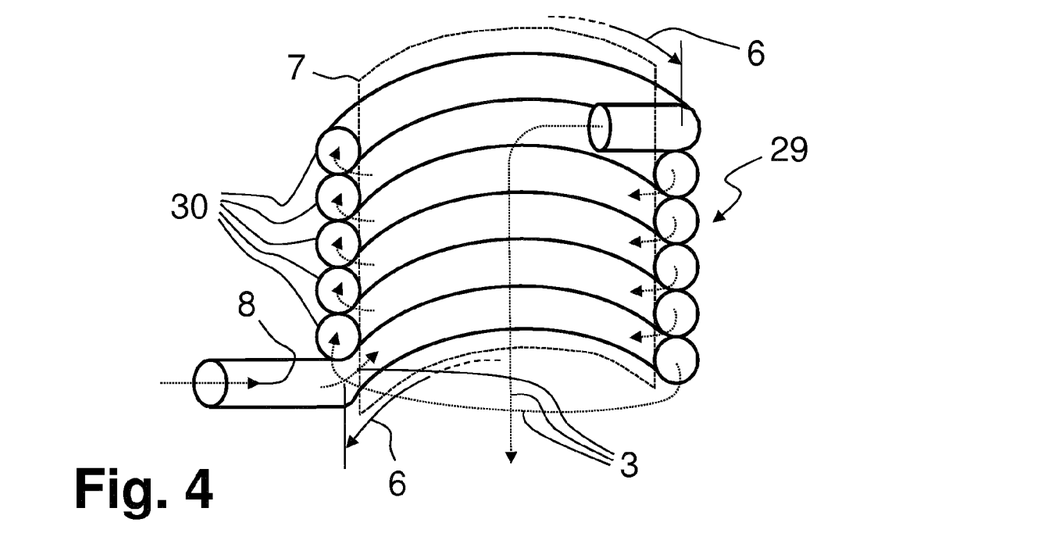
FIG. 4: shows a variant of a jacket for a described device.

FIG. 4 shows a further embodiment of a section 6 of a delivery path 3 that forms a jacket 7. Here, the delivery path 3 is formed in the manner of a spiral with a multiplicity of line windings 30 that form the jacket 7. Overall, the delivery path 3, owing to the spiral configuration, forms an areal element 29. Such an embodiment of the jacket 7 by way of the delivery path 3 is probably not expedient because the partition walls between the individual windings of the delivery path 3 in the jacket 7 each form heat bridges through the jacket 7, and at the same time, the flow resistance for the liquid additive through the delivery path 3 is particularly large owing to the length of the delivery path 3 through the jacket 7. Nevertheless, the design variant illustrated in FIG. 4 constitutes an alternative design for the jacket 7.

Figure 5:
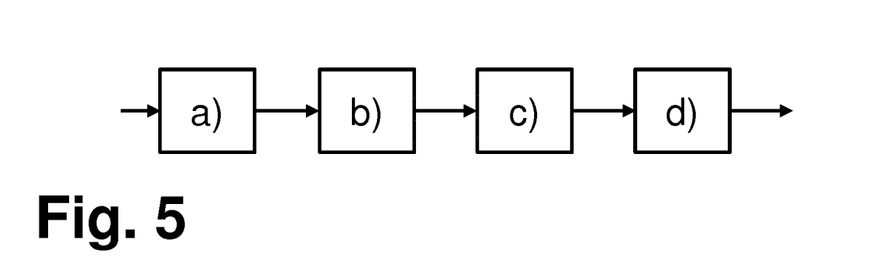
FIG. 5: shows a flow diagram of the described method.

FIG. 5 shows a flow diagram of the described method. It can be seen how the method steps a) to d) are carried out in succession. Delivery of the liquid additive takes place in step a), the delivery is stopped in step b), and the section of the delivery path is at least partially evacuated in step c), wherein, in step d), a thermal insulator is formed in a jacket of the delivery path as a result of the evacuation.

Figure 6:
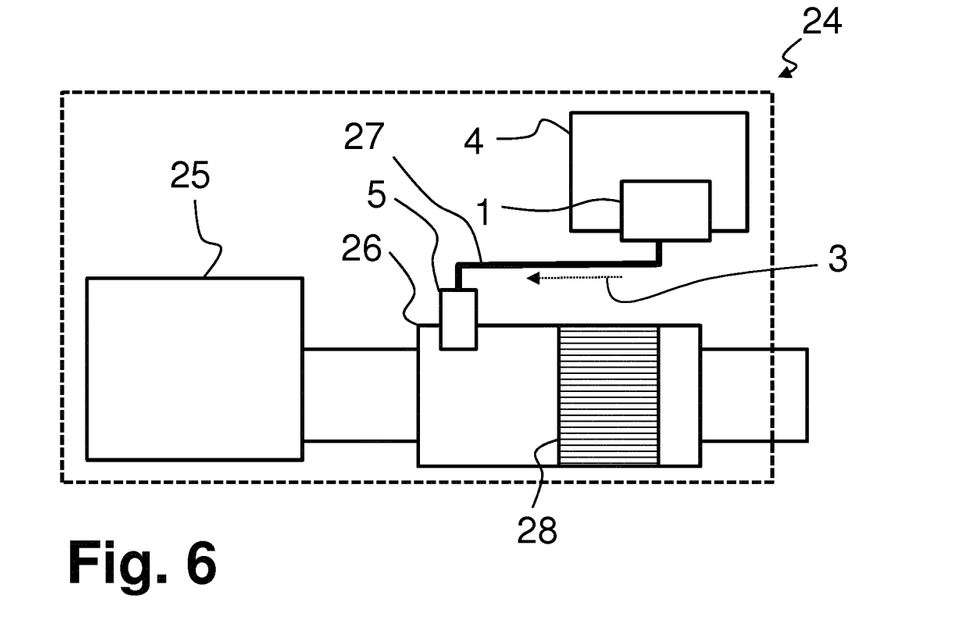
FIG. 6: shows a motor vehicle having a described device.

FIG. 6 schematically shows a motor vehicle 24 having an internal combustion engine 25 and having an exhaust-gas treatment device 26 for the purification of the exhaust gases of the internal combustion engine 25. In the exhaust-gas treatment device 26 there is provided an SCR catalytic converter 28 by which the method of selective catalytic reduction can be carried out. For the method of selective catalytic reduction, a liquid additive can be supplied to the exhaust-gas treatment device 26 by an additive dispensing device 5. Liquid additive is supplied from a tank 4 to the additive dispensing device 5 via a line 27 by a device 1. For this purpose, the liquid additive is delivered by the device 1 to the additive dispensing device 5 along a delivery path 3.

The method described here and the device described here are particularly advantageous for ensuring that a device for providing a liquid additive can be made operationally ready in a particularly rapid and reliable manner after the liquid additive has frozen in the device during a long standstill phase of a motor vehicle.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMERALS

1 Device
2 Liquid additive

3 Delivery path
4 Tank
5 Additive dispensing device
6 Section
7 Jacket
8 Delivery direction
9 Thermal insulator
10 Delivery unit
11 Heater
12 Heating section
13 Heat distribution section
14 Partitioned-off chamber
15 Wall
16 Tank interior
17 Areal cavity
18 Filter
19 Gap
20 Bell-shaped cover
21 Base region
22 Top region
23 Internal suction point
24 Motor vehicle
25 Internal combustion engine
26 Exhaust-gas treatment device
27 Line SCR catalytic converter Areal element
28 Line winding
29 Lid

The invention claimed is:

1. A method for operating a device (1) that provides a liquid additive (2), the device having a delivery path (3) running from a tank (4) storing the liquid additive (2) to an additive dispensing device (5), a delivery unit (10) arranged within the tank (4), and a partitioned-off chamber (14) arranged within the tank (4), the delivery unit (10) being arranged within the partitioned-off chamber (14), wherein at least one section (6) of the delivery path (3) forms a jacket (7) around the partitioned-off chamber (14) and around the delivery unit (10), the method comprising:
 a) delivering the liquid additive (2) from the tank (4) to the additive dispensing device (5) along the delivery path (3) in a delivery direction (8);
 b) stopping the delivery of the liquid additive (2);
 c) at least partially evacuating the section (6) of the delivery path (3); and
 d) forming a thermal insulator (9) in the jacket (7) around the partitioned-off chamber (14) and around the delivery unit (10) by the evacuated delivery path (3), such that the thermal insulator provides insulation of the delivery unit (10) with respect to the tank interior at a circumferential surface of the partitioned-off chamber (14).

2. The method according to claim 1, wherein the section (6) of the delivery path (3) is evacuated by the liquid additive (2) being delivered from the delivery path (3) back into the tank (4) counter to the delivery direction (8).

3. The method according to claim 1, wherein the section (6) of the delivery path (3) is evacuated by the liquid additive (2) in the section (6) of the delivery path (3) being at least partially evaporated.

4. A device (1) that provides a liquid additive (2), the device comprising:

a delivery path (3) running from a tank (4) storing the liquid additive (2) to an additive dispensing device (5), wherein at least one section (6) of the delivery path (3) forms a jacket (7);
a delivery unit (10) at least partially surrounded by the jacket (7), the delivery unit (10) being arranged in a partitioned-off chamber (14) in the tank (4) storing the liquid additive (2),
wherein the jacket (7) runs at least partially along a wall (15) of the partitioned-off chamber (14) and forms an areal cavity (17), such that the thermal insulator (9) insulates the partitioned-off chamber (14) with respect to a tank interior (16), and
wherein the delivery path (3) is, in a region of the jacket (7), formed by the areal cavity (17) between the wall (15) of the partitioned-off chamber (14) and a bell-shaped cover (20) surrounding the partitioned-off chamber (14), wherein the delivery path (3) opens from the tank interior (16) into the areal cavity (17) at a base region (21) of the bell-shaped cover (20) and exits the areal cavity through an internal suction point (23) at a top region (22) of the bell-shaped cover (20), the device (1) being configured to carry out a method including:
 a) delivering the liquid additive (2) from the tank (4) to the additive dispensing device (5) along the delivery path (3) in a delivery direction (8);
 b) stopping the delivery of the liquid additive (2);
 c) at least partially evacuating the section (6) of the delivery path (3); and
 d) forming a thermal insulator (9) in the jacket (7) by the evacuated delivery path (3).

5. The device according to claim 4, the device further having a heater (11), wherein the jacket (7) is arranged at least partially between the heater (11) and the delivery unit (10), such that the thermal insulator (9) in the jacket (7) at least partially thermally insulates the delivery unit (10) with respect to the heater (11).

6. The device according to claim 5, wherein the heater (11) has at least one active heating section (12) and at least one passive heat distribution section (13), wherein the passive heat distribution section (13) is insulated with respect to the delivery unit (10) by the thermal insulator (9) in the jacket (7).

7. The device according to claim 4, the device further having a filter (18) arranged proximate the jacket (7), the filter (8) being configured to filter the liquid additive in the delivery path (3).

8. The device (1) according to claim 4, wherein the wall (15) of the partitioned-off chamber (14) and the bell-shaped cover (20) each comprise plastic, and at least one section of at least one heater (11) for heating liquid additive (2) in the tank interior (16) is at least partially embedded into the bell-shaped cover (20).

9. A motor vehicle (24) comprising:
an internal combustion engine (25);
an exhaust-gas treatment device (26) configured to purify exhaust gases of the internal combustion engine (25); and
the device (1) according to claim 4, by which the liquid additive (2) can be supplied to the exhaust-gas treatment device (26).

* * * * *